United States Patent
Kawaguchi et al.

(10) Patent No.: US 6,271,893 B1
(45) Date of Patent: Aug. 7, 2001

(54) DIGITAL TELEVISION BROADCASTING SYSTEM

(75) Inventors: Toru Kawaguchi, Matsudo; Ryota Tsukidate; Yoshiyasu Takeuchi, both of Tokyo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/220,890

(22) Filed: Dec. 28, 1998

(30) Foreign Application Priority Data

Dec. 26, 1997 (JP) .................................................. 9-368945

(51) Int. Cl.⁷ .............................. H04N 7/00; H04N 5/44; H04N 5/63
(52) U.S. Cl. .................... 348/725; 348/730; 348/460; 348/906; 725/54; 725/50; 725/39
(58) Field of Search ..................................... 348/730, 725, 348/729, 460, 473, 477, 552, 553, 554, 6, 10, 12, 423, 906; 725/30, 50, 54; 455/5.1, 3.2, 4.2, 4.1, 6.1

(56) References Cited

U.S. PATENT DOCUMENTS

| | | | |
|---|---|---|---|
| 5,452,288 * | 9/1995 | Rahuel et al. | 370/19 |
| 5,625,406 * | 4/1997 | Newberry et al. | 348/7 |
| 5,630,119 * | 5/1997 | Aristides et al. | 395/601 |
| 5,666,645 * | 9/1997 | Thomas et al. | 455/6.1 |
| 5,726,989 * | 3/1998 | Dokic | 370/509 |
| 5,801,753 * | 9/1998 | Eyer et al. | 348/13 |
| 5,826,166 * | 10/1998 | Brooks et al. | 455/5.1 |
| 5,859,660 * | 1/1999 | Perkins et al. | 348/9 |
| 5,867,207 * | 2/1999 | Chaney et al. | 348/7 |
| 5,892,535 * | 4/1999 | Allen et al. | 348/9 |
| 5,940,148 * | 8/1999 | Joseph et al. | 348/845 |
| 5,963,264 * | 10/1999 | Jackson | 348/460 |
| 6,016,172 * | 1/2000 | Huh | 348/845.1 |
| 6,025,837 * | 2/2000 | Matthews, III et al. | 345/327 |
| 6,029,045 * | 2/2000 | Picco et al. | 455/5.1 |
| 6,057,890 * | 5/2000 | Virden et al. | 348/563 |
| 6,163,316 * | 12/2000 | Killian | 345/327 |

FOREIGN PATENT DOCUMENTS 9-275530   10/1997  (JP) .

* cited by examiner

Primary Examiner—Reinhard J. Eisenzopf
Assistant Examiner—Paulos M. Natnael
(74) Attorney, Agent, or Firm—Israel Gopstein

(57) ABSTRACT

A digital television transmitter transmits a transport stream (hereinafter referred to as "TS") comprising content data for a plurality of channels to receivers. In the transmitter, program information is periodically inserted in the TS; and an expected time of program alteration is included in said TS. A television receiver comprises a first portion always supplied with an electric power, a second portion which, if supplied with a second electric power, becomes capable of collecting program information included in said TS in corporation with said first portion, and a third portion which, if supplied with a third electric power, becomes capable of displaying said program. At an expected time of program alteration previously received, the second power is supplied to the second portion to collect program information, which is preferably stored in nonvolatile memory. The transmitter sending an alert signal to the receiver via a second transmission media ensures the reception of changed or special program information.

22 Claims, 11 Drawing Sheets

EXPECTED ALTERATION TIME LIST AT 15:00, 12/17

| EXPECTED ALTERATION TIME | 340 |
|---|---|
| 15:30, 12/17 | |
| 18:00, 12/17 | |
| 11:30, 12/18 | |
| ⋮ | |

EXPECTED ALTERATION TIME LIST AT 15:00, 12/17

EXEMPLARY EMERGENCY CODE FORMAT
Cem [TIME AND DATE]
([TIME AND DATE] IS OPTION)

FIG. 6

UPDATE TIME LIST AT 16:00, 12/17

| EXPECTED ALTERATION TIME | 340a |
|---|---|
| 18:00, 12/17 | |
| 21:00, 12/17 | |
| 11:30, 12/18 | |
| 18:00, 12/18 | |
| 21:00, 12/18 | |
| ⋮ | |

| | |
|---|---|
| CHANNEL ID | 326 |
| PROGRAM ID | 321 |
| PROGRAM NAME | 322 |
| CATEGORY | 323 |
| START TIME AND DATE | 324 |
| END TIME AND DATE | 325 |
| CREATE/CHANGE TIME & DATE | 327 |
| TIME TO CHANGE | 328 |
| PRIORITY | 329 |
| FIRST RECEPTION TIME (T1) | 331 |
| RECEPTION COUNT (Cr) | 332 |
| RECEPTION INTERVAL (I) | 333 |
| LAST ACCESS TIME | 334 |
| ACCESS FREQUENCY | 335 |
| READINESS | 336 |
| ⋮ | 330 |
| DETAILED INFORMATION | 337 |

SUBSTITUTION FOR STEP 456

DIGITAL TELEVISION BROADCASTING SYSTEM

BACKGROUND OF THE INVENTION

1. Field of the Invention

The invention generally relates to a digital video channel broadcasting system comprising a transmitter and a multiplicity of receivers and, more particularly, to a method and subsystem for use in such a system for effectively transmitting and receiving program information while reducing the electric power consumed for program information reception in each receiver.

2. Description of the Prior Art

In a digital television broadcasting system such as a satellite broadcasting, a CATV (cable television) system, etc., a broadcasting station or transmitter periodically transmits program information by including the program information in a transport stream, which comprises time-division multiplexed program data for a plurality of channels. The program information is received and stored by television receivers for displaying a program guide in response to a user's request. However, a program may be changed and a special or emergency broadcast may be delivered at any time. For this reason, in order to cope with the changes in program and special or emergency broadcasts, television (TV) receivers have to keep on receiving the program information even when no channel is viewed, causing the electric power consumption of each TV receiver to be increased.

Japanese unexamined patent publication Hei.9-275,530 discloses "TELEVISION RECEIVER" as a solution to this problem. In the TV receiver, a controller is always supplied with electric power. A first power supply to a tuner and a signal processing circuit and a second power supply to an audio circuit, a driver circuit, a display device and a loudspeaker are controlled by the controller. The electronic program guide (EPG) is received only at times preset by the user, in which only the first power supply is effected. Both the first and second power supplies are effected during the user viewing a program, and none of them is effected otherwise.

However, if any change in the EPG has been made after the last time of EPG reception, the change will not be reflected in a TV program schedule displayed by a command from the user. Further, any special or emergency broadcast which is not included in the last EPG data is missed in the above-cited prior art.

It is an object of the invention to provide a digital TV transmitter and a receiver that ensures the reception of program information and any irregular program while saving the power consumption in the receiver.

Generally speaking, only a part of EPG data has been changed even in EPG data received at a relatively long interval such as several hours. Therefore, it is not efficient to update all of the stored program information each time of EPG data reception.

It is another object of the invention to provide a digital TV transmitter and a receiver that saves the power consumption in the receiver by updating only data portions of the stored program information which include changed EPG data.

If a receiver has a memory with a capacity insufficient to store all of the received EPG data, it will take some time to collect EPG data which has not stored in the memory and to display program information in response to a program schedule display command from the user.

It is still another object of the invention to provide a digital TV transmitter and a receiver that first displays programs of higher priorities which have been stored in nonvolatile memory and then displays programs of lower priorities which have been received after the detection of a program information display command for providing a quick response.

SUMMARY OF THE INVENTION

A digital television transmitter transmits a transport stream (hereinafter referred to as "TS") comprising content data for a plurality of channels to receivers. In the transmitter, program information is periodically inserted in the TS; and an expected time of program alteration is included in said TS. A television receiver comprises a first portion always supplied with an electric power, a second portion which, if supplied with a second electric power, becomes capable of collecting program information included in said TS in corporation with said first portion, and a third portion which, if supplied with a third electric power, becomes capable of displaying said program. At an expected time of program alteration previously received, the second power is supplied to the second portion to collect program information, which is preferably stored in nonvolatile memory.

Since the transmitter can send an alert signal to the receiver via a second transmission media, it is ensured that the receivers can receive changed program information and program information for special or emergency broadcast.

BRIEF DESCRIPTION OF THE DRAWING

The features and advantages of the present invention will be apparent from the following description of an exemplary embodiment of the invention and the accompanying drawing, in which.

Throughout the drawing, the same elements when shown in more than one figure are designated by the same reference numerals.

DETAILED DESCRIPTION OF THE PREFERRED EMBODIMENTS

Figure 1:
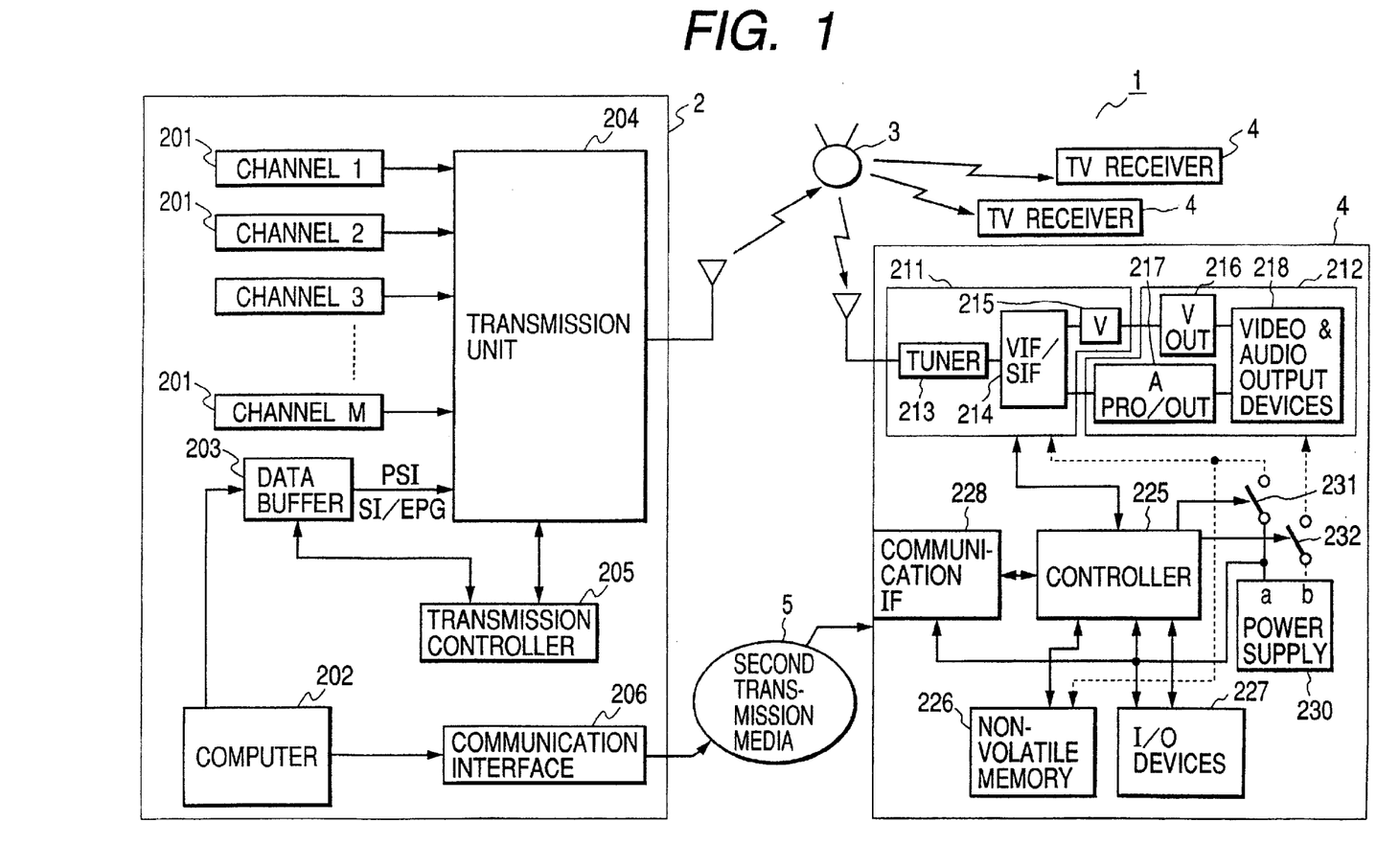
FIG. 1 is a diagram showing an exemplary arrangement of a digital TV broadcasting system in accordance with an illustrative embodiment of the invention.

FIG. 1 is a diagram showing an exemplary arrangement of a digital TV broadcasting system in accordance with an illustrative embodiment of the invention. The present invention is applicable to any broadcasting system that frequently transmits program information together with the program contents in a multiplexed manner. However, in FIG. 1, the digital TV broadcasting system 1 is assumed to be a satellite broadcasting system. The broadcasting system 1 comprises at least one broadcasting satellite earth station or digital TV transmitter 2 for transmitting a transport stream comprising a plurality (M) of channels, a broadcasting satellite space station 3 which relays transport streams including the one from the digital TV transmitter 2, a multiplicity of digital TV receivers 4 for receiving the transport streams from the space station 3, and a second transmission media 5 which enables the digital TV transmitter 2 to inform the TV receivers 4 of irregular broadcasts such as special and emergency broadcasts and/or changes in the program information. The second transmission media 5 may be any transmission media which is other than the broadcasting satellite 3 and which causes the power consumption in each TV receiver 4 during waiting for a communication from the earth station 2 to be less than the power consumption in each TV receiver 4 during receiving the program information without using program contents, i.e., without displaying any program. Some examples of the second transmission media 5 are a telephone network, a power line, an AM (amplitude modulation) or FM (frequency modulation) radio wave, a CATV, etc.

The digital TV transmitter 2 comprises M channel units 201 each for supplying a contents data stream of each of the programs for the channel; a computer 202 for preparing and storing PSI (Program Specific Information described later) data and SI/EPG (Service Information/Electronic Program Guide) data; a data buffer 203 for temporarily storing the PSI and SI/EPG data (or program data or information); a transmission unit 204 for multiplexing and transmitting the contents data streams and the program information; and a transmission controller 205 for controlling the data buffer 203 and the transmission unit 204. In order to communicate to the subscriber TV receiver 4, the digital TV transmitter 2 further comprises a communication interface 206 for providing the computer 202 with an interface to the second transmission media 5. The received signal processor 211 comprises a tuner 213 for selecting a specified one of the received transport streams; a VIF/SIF (video intermediate frequency processor and sound intermediate frequency processor) for extracting the PSI and SI/EPG data, and a video signal and an audio signal for a channel specified by a control signal from the controller 225 from the selected transport stream; and a video signal processor (labeled "V") 215. The output portion 212 comprises deflecting circuits (labeled "V OUT") 216; an audio signal processor and output circuit (A PRO/OUI) 217; and video and audio output devices 218.

If the second transmission media 5 is a public-switched telephone network then the second transmission media 5 preferably comprises first relay points (not shown), placed in respective areas in a nation or a service area of the digital TV, for relaying the communication from the digital TV transmitter 2; second relay points (not shown), placed in respective smaller areas in each area, for relaying the communication from an associated first relay point; and terminal relay points (not shown) placed in exchange offices in each smaller area for relaying the communication from an associated second relay point to the subscriber TV receivers 4 serviced by respective exchange offices.

The digital TV receiver 4 comprises a received signal processor 211 for processing received signals to provide a video signal and an audio signal for a specified channel in a transport stream which contains the specified channel and to provide EPG data; an output portion 212 for providing a video and audio output in response to the video signal and the audio signal; a controller 225 for controlling the received signal processor 211, a nonvolatile memory 226 for storing the program information, I/O devices 227 which enable the user to control the digital TV receiver 4; and at least one electric power supply 230. In order to be informed by the TV transmitter 2, the digital TV receiver 4 further comprises a communication interface 228 for providing the controller 225 with an interface from the second transmission media 5.

A first electric power is always supplied from a first power terminal 230a of the power supply 230 through conductors shown in solid lines to the controller 225, the I/O devices 227 and the communication interface (IF) 228 so that the TV receiver 4 can be informed at any time by the TV transmitter 2. The TV receiver 4 further comprises a switch circuit 231 inserted between the first power terminal 230a and a conductor leading to the received signal processor 211 and the nonvolatile memory 226 and a switch circuit 232 inserted between a second power terminal 230b of the power supply 230 and the output portion 212. The control terminals of the switch circuits 231 and 232 are connected with respective control output terminals of the controller 225. This enables the controller 225 to control independently respective supplies of a second electric power from the switch circuit 231 and a third electric power from the switch circuit 232. When neither a channel nor the program information is received, both the switches 231 and 232 are controlled to open. When only the program information is being received without receiving any channel, the switch 231 is kept closed while keeping the switch 232 open. When any channel is being viewed, both the switches 231 and 232 are kept closed.

In operation, the operator of the TV transmitter 2 creates a program information database (not shown) for storing program information in the computer 202 and enters a program information record for each of the programs within at least a predetermined period, e.g., 48 hours for each of the channels 1 through M.

Figure 2:
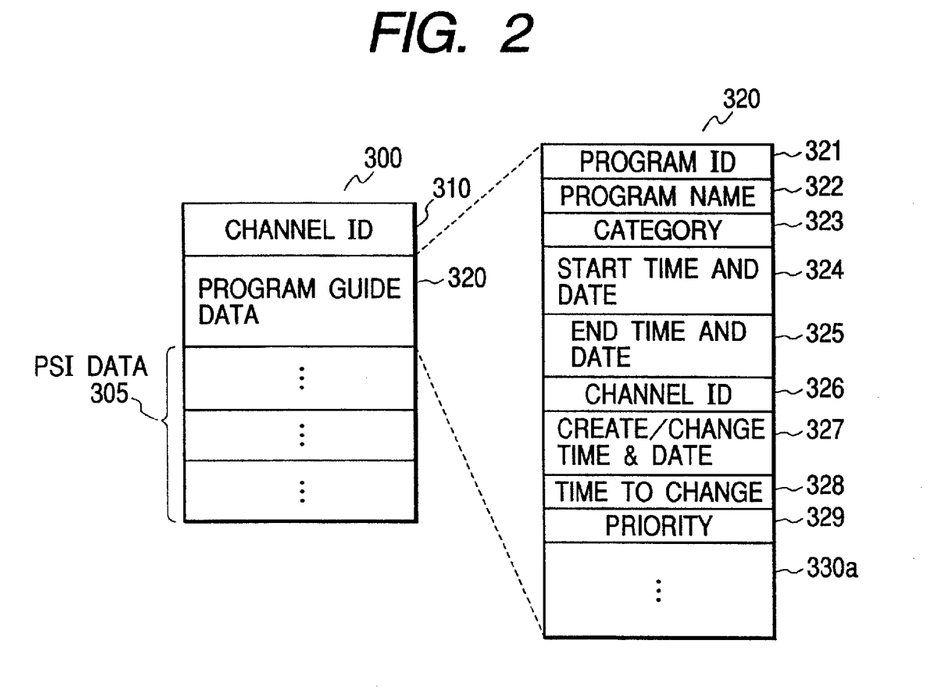
FIG. 2 is a schematic diagram showing an arrangement of the above mentioned program information record.

FIG. 2 is a schematic diagram showing an arrangement of the above mentioned program information record. In FIG. 2, the program information record 300 comprises channel ID field 310, program guide data fields 320, and PSI data fields 305. This program information record 300 is created for each broadcasting program of each channel. The channel ID field 310 contains an ID of the channel i ($1 \leq i \leq M$). The program guide data fields 320 contain a program ID 321, a program name 322, the category 323 of the program, start time and date 324, end time and date 325, a channel ID 326, create/change time & date 327, time to be changed 328, a priority 329 and other descriptive data 330. The create/change time & date 327 is a time when the program information record 300 has been created or altered last. The value of the create/change time & date 327 is automatically set in the create/change time & date field 327 by the computer 202 when the program information record 300 is added or altered. The operator is permitted to include the priority 329 data and/or the time to change 328 in the program information record 300 if necessary. The priority 329 is set by the operator for the program information record 300.

The use of Expected Program Alteration Time

Figure 3:
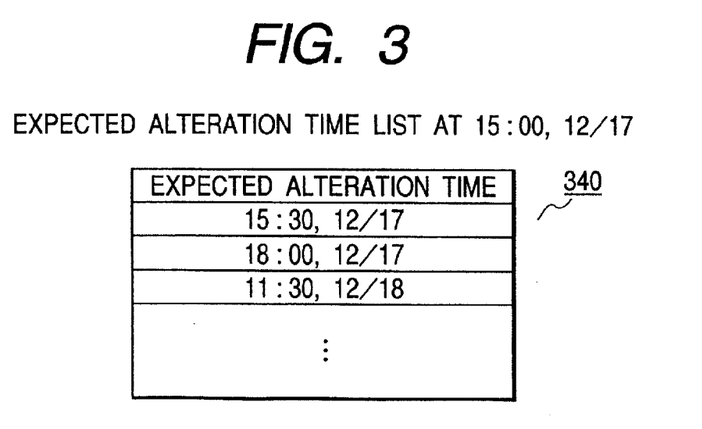
FIG. 3 is an example of an expected alteration time list at 15:00 of 12/10.

The time to change 328 is the expected time of alterations to the program information record 300. This information is used for programs some details of which can not be decided till a certain event occurs. An example of such programs is a relay broadcast of a game or match in which one of the competitors can not be decided till a particular game or match is over. This information enables the TV receivers 4 to update the program information stored in the nonvolatile memory 226 at the time to change 328. In other words, the value of the time-to-change field 328 triggers an operation of the TV receiver 4 collecting program information at the time specified by the time-to-change field 328. It is noted that the alteration to the program information record 300 has to be completed sufficiently, say, some minutes before the expected time of the alteration so that the transmission of altered program information record 300 is started before the time to change 328. In a preferred embodiment, the time to change 328 is so adjusted that the time interval between any adjacent times to change 328 is not shorter than a predetermined time period, say, one hour. In order to facilitate the operation, the computer 202 preferably keeps an expected alteration time list 340 as shown in FIG. 3. In this example, alterations are scheduled at 15:30, 18:00 of 12/17 and 11:30 of 12/18.

The program information records 300 in the program information database are frequently compiled into SI/EPG packets, which is multiplexed with the channel data streams more frequently, e.g., every one through several seconds for transmission.

Figure 4:
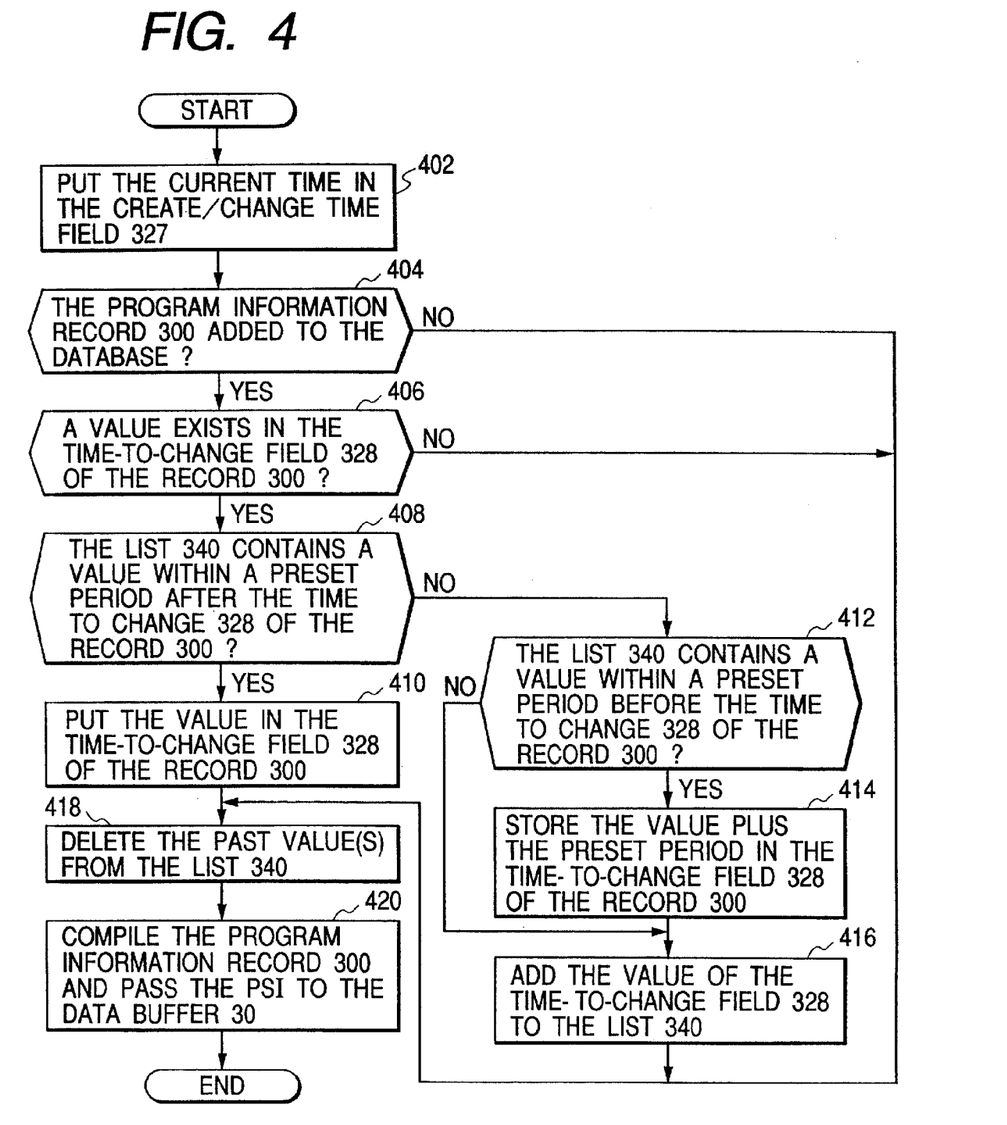
FIG. 4 is a flow chart showing an exemplary operation executed by the computer 202 when a new program information record 300 has been added to the database or any program information record 300 of the database has been altered.

FIG. 4 is a flow chart showing an exemplary operation executed by the computer 202 when a new program information record 300 has been added to the database or any program information record 300 of the database has been altered. In step 402, the current time is stored in the create/change time field 327 of the program information record 300. In step 404, a test is made to see if the record 300 is an added one. If so, a test is made in step 406 to see if a value exists in the time-to-change field 328 of the record 300. If the test result is NO in step 404 or 406, then the control is passed to step 418, where the past value(s) or the value(s) indicative of a time before the current time is (or are) deleted from the expected alteration time list 340 of FIG. 3. Then in step 420, the record 300 is compiled into PSI data and the PSI data is passed to the data buffer 30, terminating the operation.

If the test result is YES in decision step 406, a test is made in step 408 to see if the list 340 contains a value within a preset period or interval (say, one hour) after the time to change 328 in the record 300. If so, the value is stored in the time-to-change field 328 of the record 300 in step 410 and the control is passed to step 418. Thereafter, the steps 418 and 420 are executed as described above.

If the test result is NO in step 408, then another test is made in step 412 to see if the list 340 contains a value within the preset period or interval before the time to change 328 of the record 300. If so, the value plus the preset period is stored in the time-to-change field 328 of the record 300 in step 414. If a longer interval is permitted between program information collections, the preset period may be added to the value of the time-to-change field 328 in step 414.

After step 414 or if the test result is NO in step 412, the control is passed to step 416, where the value of the time-to-change field 328 is added to the expected alteration time list 340. Thereafter, the steps 418 and 420 are executed as described above and then the operation is terminated.

By doing this, the TV transmitter 2 can inform the TV receivers 4 of the expected alteration times for the programs the expected alteration time of which can be determined in advance.

In addition to the above operation, program information update (or collection) times that are set periodically or at the operator's discretion may be transmitted. This enables the TV receivers 4 to update the program information for programs whose program information has been changed unexpectedly. Preferably, the program information update (or collection) times are also listed in order of time in the expected alteration time list 340.

Figure 5:
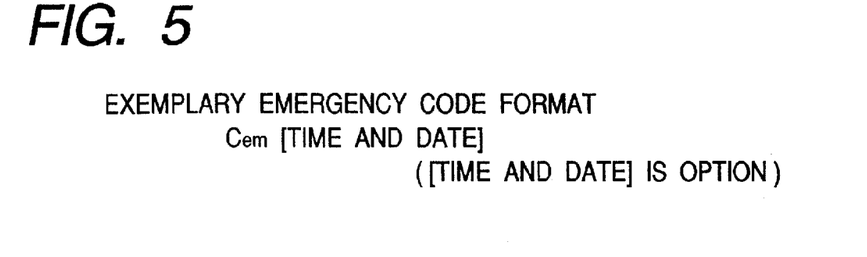
FIG. 5 shows an exemplary emergency code format.

It is also noted that the TV transmitter 2 may transmit a predetermined emergency code indicative of an emergency or special broadcast. Assuming that the emergency code is represented as $C_{em}$, the emergency code has the following format as shown in FIG. 5.

$C_{em}$[time and date], where [time and date] is option. Specifically, if the emergency code is transmitted alone without time and date, this means that an emergency broadcast is being delivered. If the emergency code is accompanied by time and date, this means that an emergency broadcast is going to be delivered at the time and date.

However, the TV receivers 4 that are informed of the on-going or expected emergency broadcast are only TV receivers that happens to be executing a program information collection operation or to be receiving any channel during the transmission of the emergency codes. The other TV receivers 4 can not know the emergency broadcast. In order to ensure the reception of any emergency broadcast, the TV receivers 4 are preferably alerted through the second transmission media 5.

Alerting Through the Second Transmission Media 5

If an irregular broadcast such as an emergency broadcast is scheduled in advance, the operator may enter a program information record 300 for the irregular broadcast, including the emergency code with a broadcasting time and date. In response to the detection of the emergency code, the computer 202 places alert calls to predetermined relay points if the second transmission media is a PSTN (public switched telephone network). In this case, the computer 202 may place the alert call either immediately after the detection of the emergency code or at the time accompanying the emergency code.

If there is no time to inform of an emergency broadcast in advance, the operator immediately puts an emergency broadcast while transmitting a special program information record including the emergency code with no time and date accompanied. In response to the detection of the emergency code, the computer 202 again places alert calls to predetermined relay points. Doing this ensures the reception of an emergency broadcast.

Figure 6:
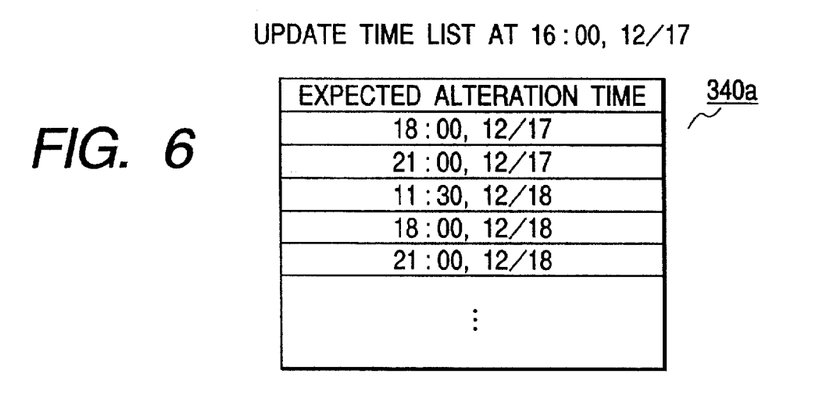
FIG. 6 is a diagram showing an example of an update time list at 16:00 of 12/17.

On the other hand, the digital TV receiver 4 updates the program information stored in the nonvolatile memory 226 by collecting EPG data during viewing a channel and in program information collection operations. The program information collection operations are triggered by the above-described times to change (or expected alteration time) 328 extracted in the program information record 300 and the program information update (or collection) times. For this purpose, each TV receiver 4 preferably keeps an update time list that is the same as the expected alteration time list 340. FIG. 6 is an example of an update time list at 16:00 of 12/17. The update time list 340a contains expected alteration times 328 as well as program information update times in order of time. It is seen from FIG. 6 that the TV receiver 4 has received 12/17 21:00, 12/18 18:00 and 12/18 21:00 either as expected alteration times or program information update times in the program information collection operation at the expected time of 12/17 15:30.

Figure 7A:
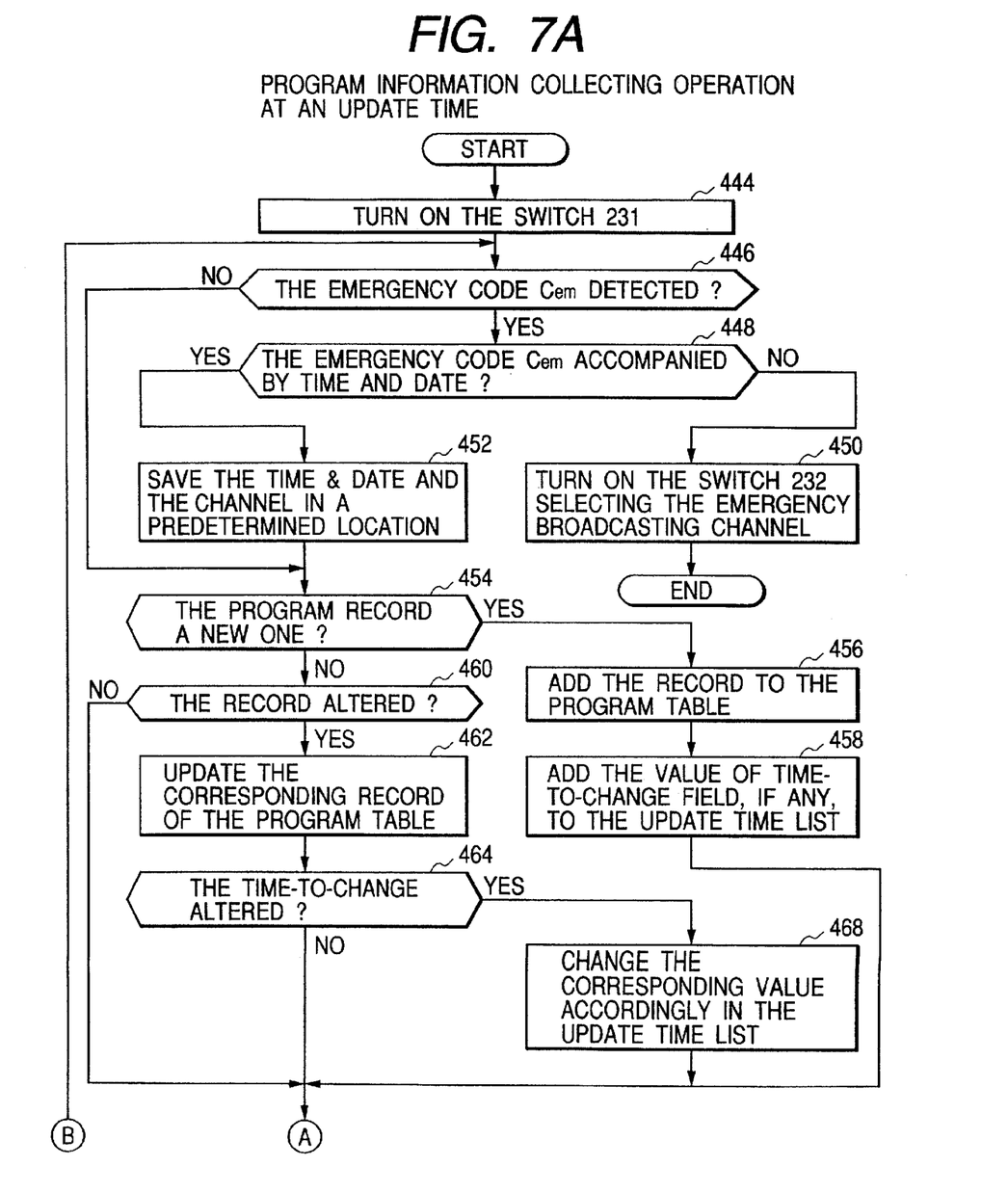
FIGS. 7A and 7B, when combined at encircled letters A and B, constitute a flow chart showing an exemplary operation of the controller 225 collecting the program information in response to the reach of a first time and date in the update time list of FIG. 6 in accordance with the illustrative embodiment of the invention.
Figure 7B:
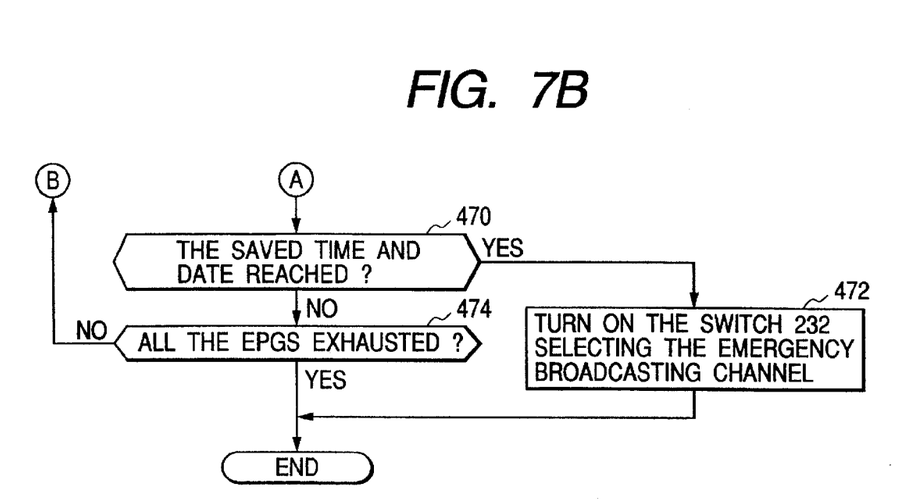

FIGS. 7A and 7B, when combined at encircled letters A and B, constitute a flow chart showing an exemplary operation of the controller 225 collecting the program information in response to the reach of a first time and date in the update time list of FIG. 6 in accordance with the illustrative embodiment of the invention. In step 444, the controller 225 turns on the switch 231 to receive a transport stream. In step 446, a test is made to see if the emergency code is detected. If so, a test is made in step 448 to see if the emergency code $C_{em}$ is accompanied by a time and date. If not, meaning that an emergency broadcast is on the air, then the controller 225 further turns on the switch 232 selecting the channel delivering the emergency broadcast in step 450 and ends the operation. It is noted that instead of turning on the switch 232, the controller 225 may alert the user by lighting an indicator or making a sound in step 450.

If the emergency code $C_{em}$ is accompanied by a time and date in step 448, the controller 225 saves the time and date and the channel on which the emergency broadcast is delivered in a predetermined memory location in step 452.

After step 452 or if the test result is NO in step 446, the control is passed to step 454, where a test is made to see if the received program guide record is new one.

Figure 8:
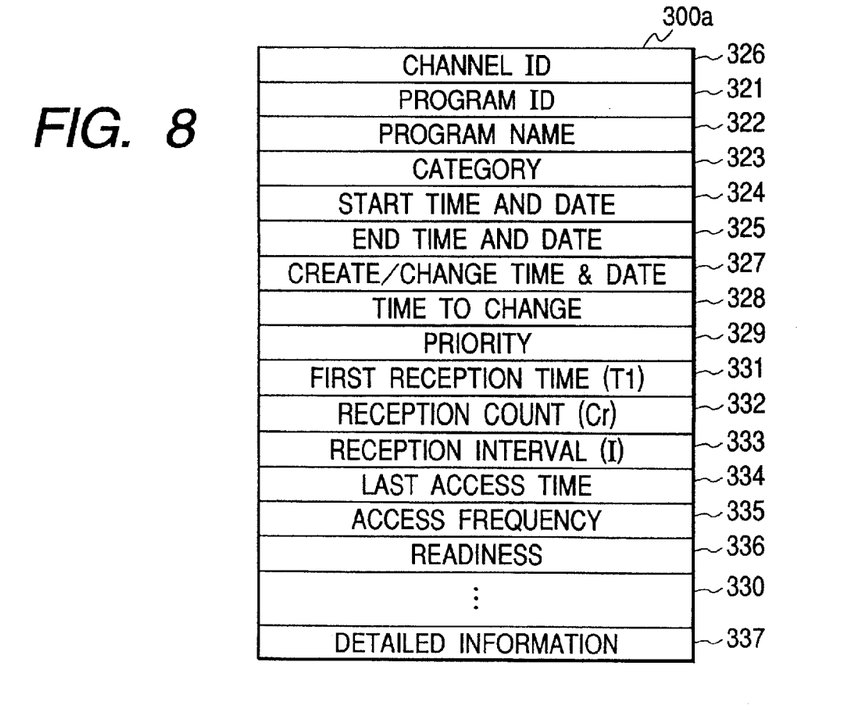
FIG. 8 is a diagram showing an exemplary structure of a program guide table that contains program information for each program of each channel.

It is noted that the controller 225 maintains a program information table as shown in FIG. 8. Each (300a) of the records of the program guide table of FIG. 8 is almost similar to the program information record 300. Each program guide record 300a comprises a channel ID 326, a program ID 321, a program name 322, the category 323 of the program, start time and date 324, end time and date 325, create/change time & date 327, time to be changed 328, a priority 329 and other descriptive data 330a.

If the received program guide record is not found in the program guide table of FIG. 8, i.e., if YES in step 454, then the program guide record is added to the table of FIG. 8 in step 456 and, if the time-to-change field 328 has a value, the value of the time-to-change field 328 is added to the update time list 340a in step 458.

If the test result is NO in step 454, a test is made in step 460 to see if the received program guide record 300a has been altered, i.e., if the create/change time and date of the received record differs from the corresponding field of the corresponding record of the program guide table of FIG. 8. If so, the controller 225 updates the program guide table record with the received program guide record in step 462. In this way, updating only the program guide records which have been altered contributes to the reduction in operation time for the program information collection and accordingly to the reduction in the power consumption.

In step 464, the controller 225 makes a test to see if the time-to-change field 328 of the program guide table of FIG. 8 has been changed. If so, then the controller 225 deletes the corresponding value from the update time list 340a and adds the value of the time-to-change field 328 to the update time list 340a in step 468.

After step 458 or 468, or if the test result is NO in step 460 or 464, the controller 225 proceeds to step 470, where a test is made to see if the time and date saved in step 452 is reached. If so, the controller 225 turns on the switch 232 selecting the channel which is expected to deliver an emergency broadcast in step 472. Otherwise, the controller 225 makes another test in step 474 to see if all kinds of SI/EPG packets have been exhausted. If so, the controller 225 ends the operation, and otherwise returns to step 446.

The above-described operation is executed at each of the times listed in the update time list 340a, which enables the TV receiver 4 to promptly display a newest program schedule in response to a request from the user.

Figure 9:
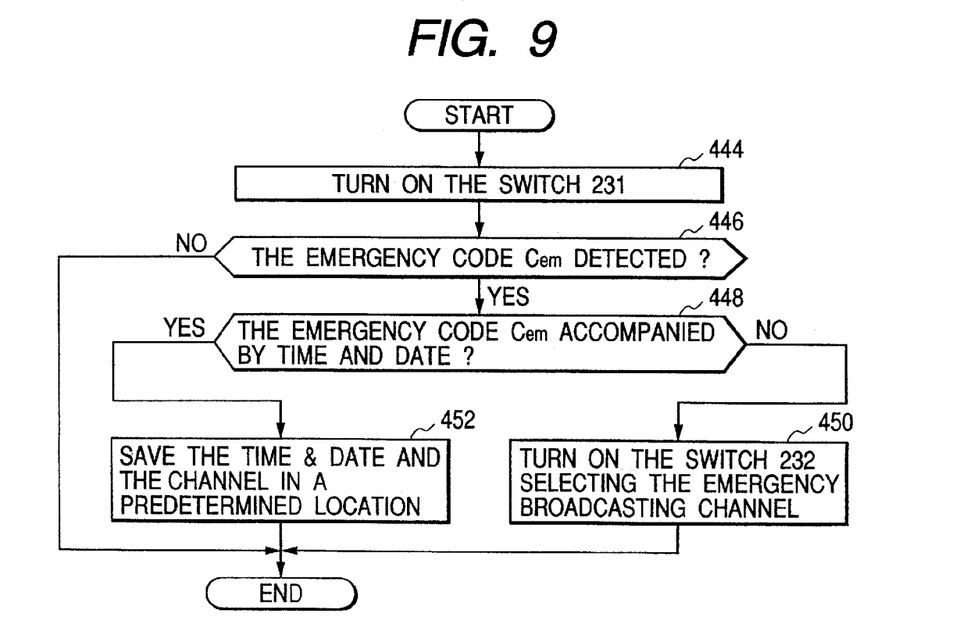
FIG. 9 is a flow chart showing an exemplary operation of an interrupt subroutine executed by the controller 225 in response to an interrupt from the communication IF 228.

FIG. 9 is a flow chart showing an exemplary operation of an interrupt subroutine executed by the controller 225 in response to an interrupt from the communication IF 228. If the communication IF 228 receives an alerting call, the IF 228 issues an interrupt signal to the controller 225. The flow chart of FIG. 9 is identical to the part of the flow chart of FIG. 7A which part comprises the steps 444, 446, 448, 450 and 452. For this reason, the detailed description of FIG. 9 will be omitted.

However, it is noted that once the time and date of emergency broadcast and the relevant channel is saved in a predetermined location in step 452 of FIG. 7A or 9, the controller 225 monitors the current time periodically. If the controller 225 detects that the saved time and date is reached, the controller 225 turns on the switches 231 and 232 selecting the saved channel to receive the emergency broadcast.

Though the second transmission media 5 is used only for emergency broadcast in the above example, the second transmission media 5 may be also used for informing the TV receivers 4 of a change of any program.

In the operation of the TV transmitter 2 shown in FIG. 4, the steps 408 through 414 has been used to ensure that the interval between adjacent times to change 328 is not less than the preset period. Instead of doing this, the steps 408 through 414 may be eliminated from the flow chart of FIG. 4, and the controller 225 may execute a routine shown in FIG. 10 before executing the operation of FIGS. 7A and 7B instead of simply executing the routine of FIGS. 7A and 7B at the time specified by the first time and date of the update time list 340a. In step 480, the controller 225 makes a test to see if it is a time specified by the first time and date in the update time list 340a. The controller 225 repeats step 480 till the first time and date is reached. In step 482, the controller 225 make s a test to see if any time and date is being deferred (or registered as deferred). If not, the controller 225 registers the first time and date as deferred by setting a flag for the first time and date or by storing the first time and date in a predetermined location in step 484. After step 484 or if the test result is YES in step 482, the controller 225 proceeds to step 486, where a test is made to see if the next time and date is within a predetermined period from the first time and date being deferred. If so, then the controller 225 waits till it becomes a time specified by the next time and date in the update time list 340a in step 488 and then returns to step 482. If the test result is NO in step 486, then the controller 225 ends the operation and enters the operation of FIG. 7, that is, proceeds to step 444 of FIG. 7A.

Figure 10:
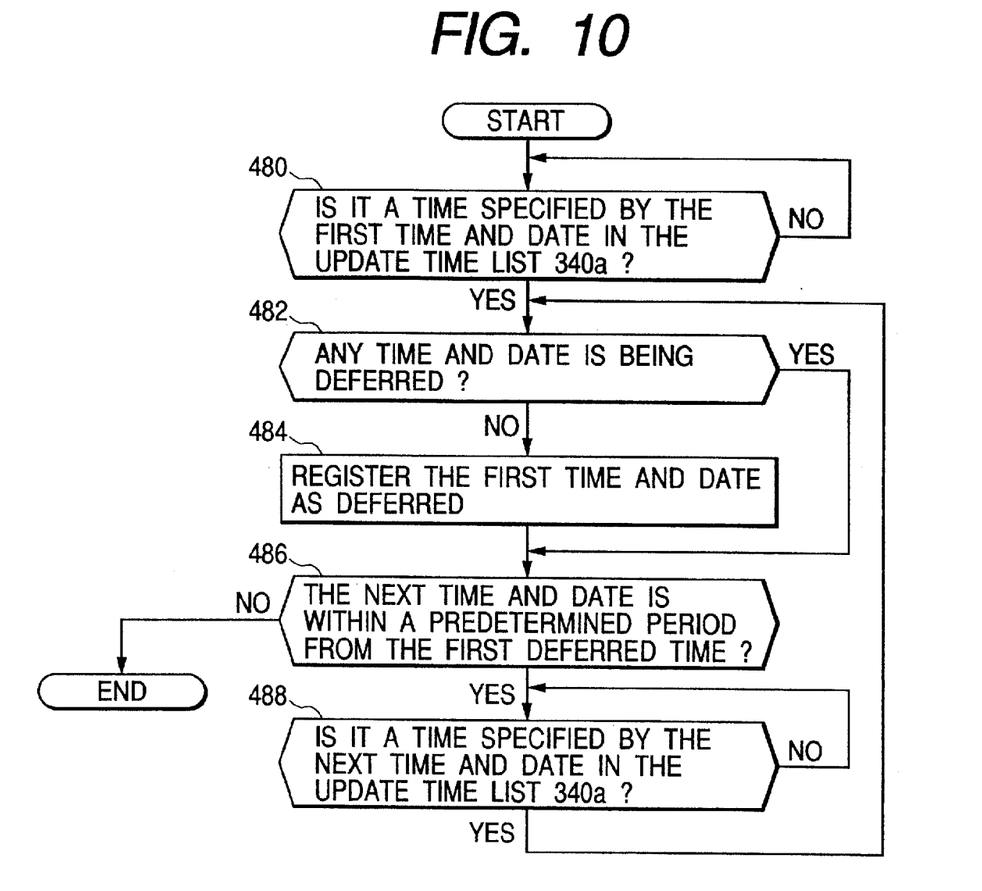
FIG. 10 is a flow chart showing an exemplary operation executed before the operation of FIG. 7.

If the update time list 340a contains 18:00, 18:03 and 18:05 for example, and the predetermined period is 5 minutes, then the controller 225 operates in the following manner. Since no time is being deferred at 18:00, the controller 225 registers 18:00 as deferred. Since the next time 18:03 is within the predetermined period of 5 minutes, the controller 225 waits till 18:03 at step 488, and returns to step 482. Since the time 18:00 is being deferred (step 482) and the next time 18:06 is not within 5 minutes from 18:00 (486), the controller 225 ends the operation.

It should be noted that the predetermined period may be set to any suitable value.

Displaying Program Information

The TV receiver 4 supports some display formats. A program time table and various program lists by category defined by the category field 323 of the program guide table are available.

By setting higher priorities to programs that the information provider desires to make the subscribers view, it is possible to display program information for programs with higher priorities faster than that of other programs. Doing this can increase the possibility of the higher-priority programs being viewed.

In the above-description it has been assumed that the nonvolatile memory 226 has enough capacity to store all of the program guide records transmitted from the TV transmitter 2. However, the nonvolatile memory 226 may have insufficient capacity. We discuss such a case in the following.

In such a case, the basic strategy is to leave program guide records for higher-priority programs in the memory 226 while discarding lower priority program guide records. The value of the priority 329 field, the reception interval (detailed later), and the priorities assigned to relative positions in the program time table with respect to the cursor position (at the time of displaying a program time table) can be used as the degree of priority.

Reception Interval

In order to find the priority of each program, each program guide record 300a include a first reception time (T1) field 331, a reception count (Cr) field 332 and a reception interval (Ir) field 333. T1 is the time when the program guide record 300a has been first received. Cr is the number of receptions of the program guide record 300a. The reception interval Ir 333 is given by (the current time−T1)/Cr.

It is assumed that the reception interval for a program for which only one program guide record has been received is simply given by the current time−T1)Cr.

In order to keep the values Cr updated, it is necessary to increment the value of the reception count Cr each time of reception of the program guide record 300a regardless of whether the program guide record 300a has been altered or not. The flow chart of the controller's operation in which the reception interval Ir is used as the degree of priority is obtained by inserting a step 490 of FIG. 11 between the steps 454 and 460 and replacing the step 456 with a routine of FIG. 12.

Figure 11:
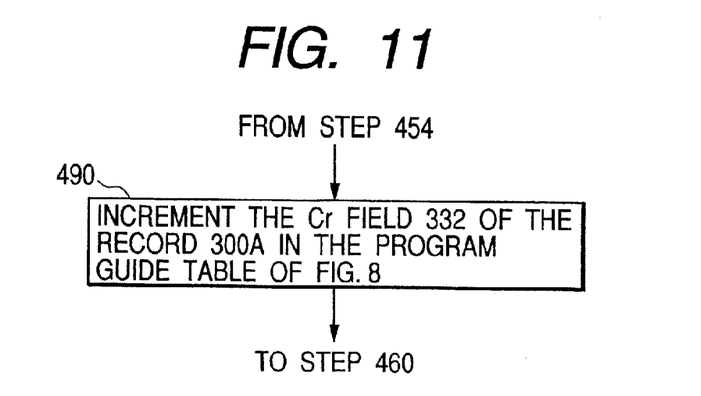
FIG. 11 is an exemplary step to be inserted between the steps 454 and 460 of the flow chart of FIG. 7.

In FIG. 11, the controller 225 increments the value of the Cr field 332 of the record 300a in the program guide table of FIG. 8 in step 490 after step 454, and proceeds to step 560.

Figure 12:
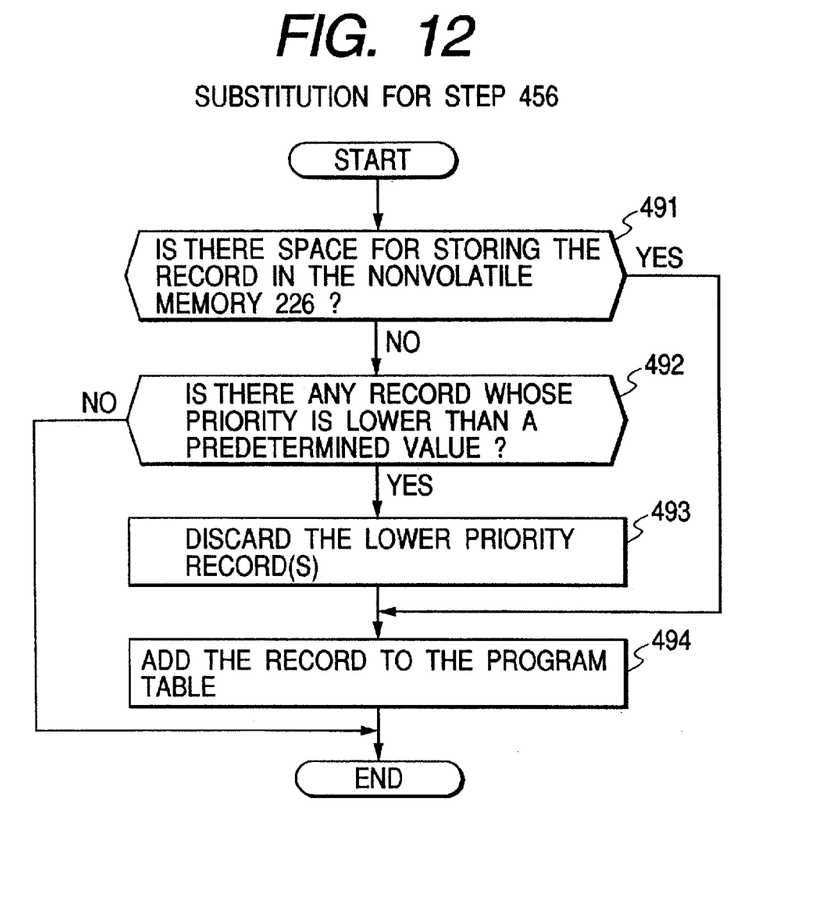
FIG. 12 is a flow chart showing an exemplary operation executed in stead of step 456 to save the capacity of the nonvolatile memory 226.

In FIG. 12, the controller 225 makes a test in step 491 to see if there is a space for storing the received program guide record in the nonvolatile memory 226. If so, the controller 225 adds the record to the program guide table in step 494 and ends the operation. Otherwise, the controller 225 makes a test in step 492 to see if there is any record whose priority (reception interval Ir in this specific example) is lower (shorter in this example) than a predetermined value. It is noted that the reception interval Ir for a new program guide record may be set to any suitable value. If such a record is not found, then the controller 225 ends the operation. If such a record is found, the controller 225 discards the found record in step 493, and proceeds to step 494, where the received program guide record is added to the program guide table.

In the above example, programs of a longer reception interval is given a higher priority. This is because since it takes a longer time to receive a program guide record of a longer reception interval, it is preferable to make an arrangement to cause such program guide records as have longer reception intervals to be stored in the nonvolatile memory 226 by giving such the program higher priorities. However, programs of a longer reception interval may be given a lower priority.

Though the reception interval Ir is used as it is as the degree of priority, the degree of priority P may be defined as $$P=A \times Ir,$$

where A is an arbitrary constant. Alternatively, the degree of priority P may be defined as $$P=A/Ir.$$

Thus, causing program guide records of higher priorities to be stored in the nonvolatile memory 226 enables program information for higher-priority programs to be displayed first.

If a plurality of lower-priority records are found in step 492, various way of processing can be considered. All of the found record may be discarded. The one of the found records that has not been accessed for the longest time may first discarded. Or, The one of the found records that has been accessed the least frequently may first discarded. In this way, a judgement may be made by a combination of the degree of priority, the last access time 334 and the access frequency 335.

Though the reception intervals Cr have been actually calculated by the controller 225 of the TV receiver 4, the reception interval Cr,i.e., the degree of priority may be calculated or set by the TV transmitter 2 side and transmitted together with the program guide records to the TV receivers 4.

Figure 13:
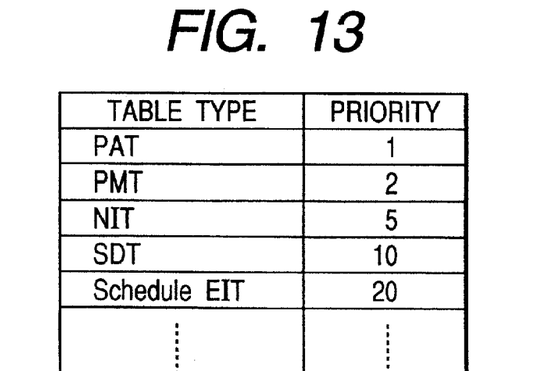
FIG. 13 is a diagram showing an example of a priority table.

In the above-described embodiment, a priority has been set to each program (or each program guide record). However, a priority may be set to each of the table types as shown in FIG. 13. In this specific example, table types PAT, PMT, NIT, SDT and schedule EIT are given priorities of 1, 2, 5, 10 and 20, respectively.

Displaying a Program Time Table Based on Readiness

Figure 14:
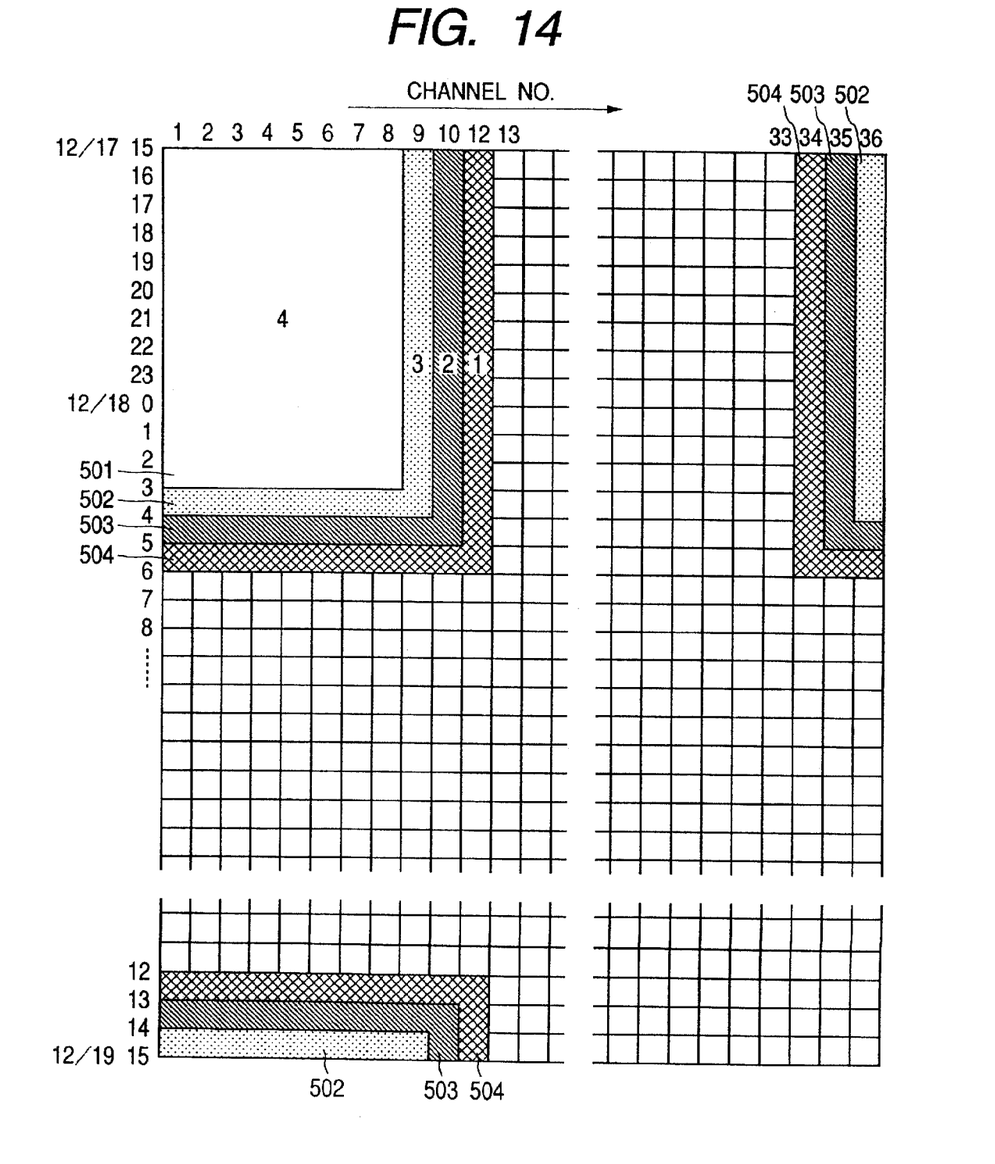
FIG. 14 is a diagram showing an exemplary readiness map defined when the user issued a program time table display command at a time from 3 p.m. and to 4 p.m. of December 17.

According to the principles of the invention, once a frame of program time table is displayed, readiness is assigned to each element of a matrix formed by the channels available in the TV broadcasting system 1 and the hours for which program information is supplied by the TV transmitter 2. FIG. 14 is a diagram showing an exemplary readiness map defined when the user issued a program time table display command at a time from 3 p.m. and to 4 p.m. of December 17. In FIG. 14, numerals written over respective columns correspond to channel numbers assigned to the available channels (36 channels in this example). The vertically arranged expressions indicate time and date for 48 hours from 3 p.m. In this specific example, programs of channels 1 through 8 from 12/17 3 p.m. to 12/18 2:59 p.m., i.e., programs in a range defined by a white box are first displayed in a frame. The first displayed programs have a readiness of 4. Dotted areas 502 have a readiness of 3. Slashed areas 503 have a readiness of 2. Hatched areas have a readiness of 1.

Figure 15:
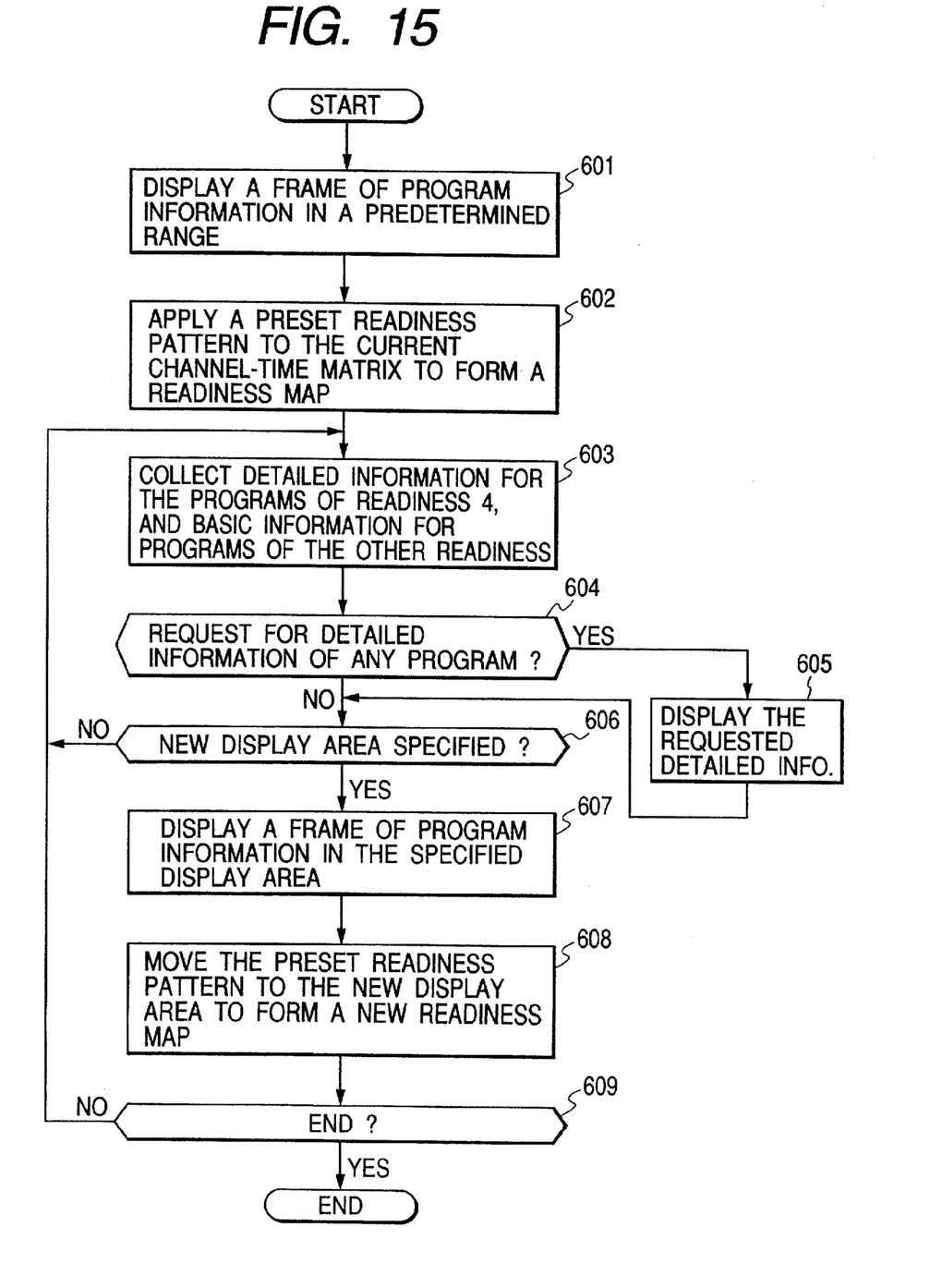
FIG. 15 is a flow chart showing an exemplary operation of displaying a program time table in accordance with the principles of the invention.

FIG. 15 is a flow chart showing an exemplary operation of displaying a program time table in accordance with the principles of the invention. In step 601, the controller 225 displays a frame of program information in a predetermined range. In step 602, the controller 225 applies a preset readiness pattern (501 through 504 in this specific example) to the current channel-time matrix to form a readiness map as shown in FIG. 14. the controller 225 collects detailed information 337 (FIG. 8) for the programs of readiness 4, and basic information for programs of the other readiness. It is assumed that the controller 225 usually collects data items 321 through 329 (basic information) for each program guide record 300a to save memory. In step 604, a test is made to see if the user has made a request for displaying detailed information 337 for any program. If so, the controller 225 displays the requested detailed information 337 in step 605. After step 605 or if the test result is NO in decision step 604, then the control is passed to step 606, where a test is made to see if any new display area is specified.

Figure 16:
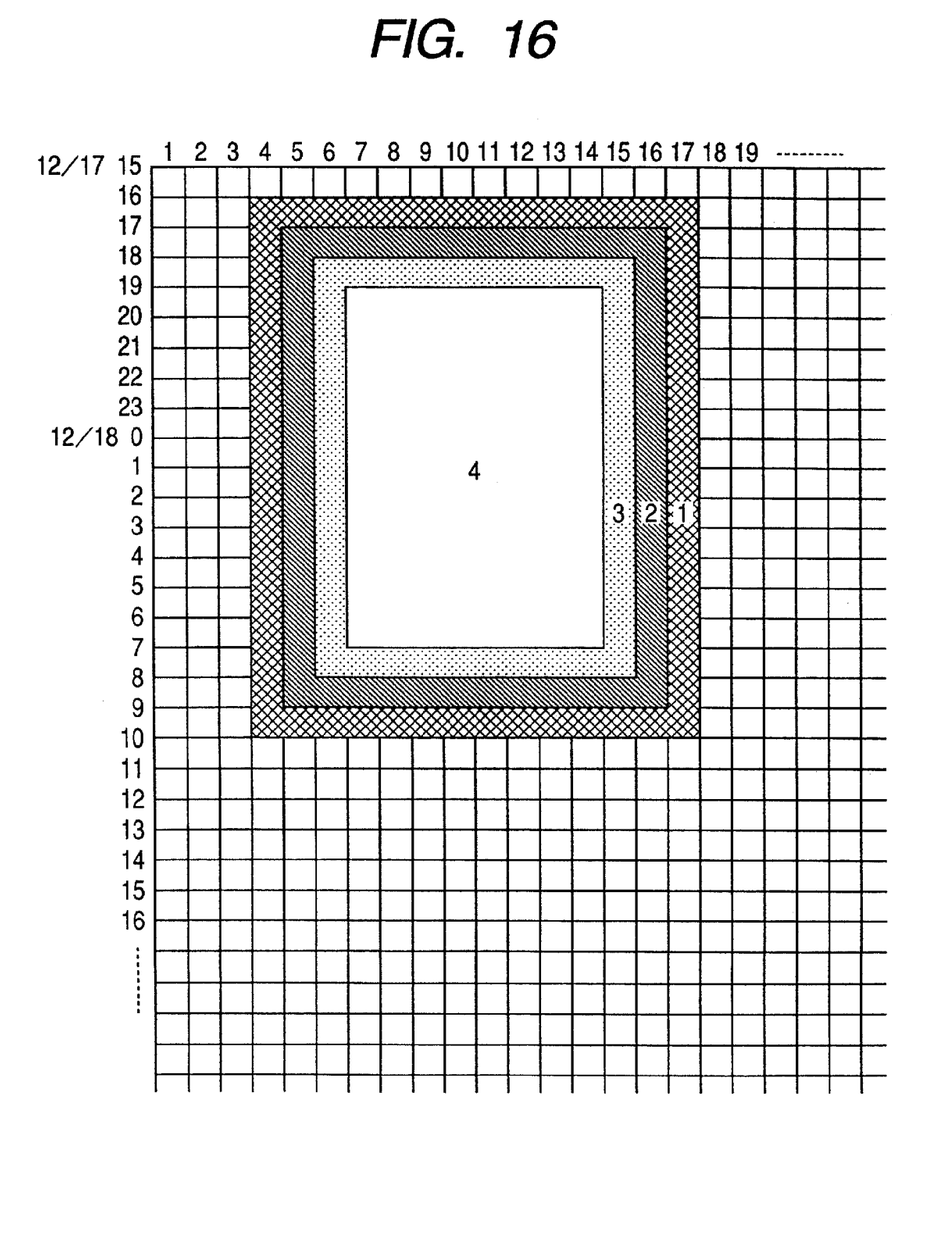
FIG. 16 is a diagram showing an exemplary readiness map defined when the display area is set for the channels 7 through 14 and for hours from 12/17 19:00 to 12/18 7:59.

If so, the controller 225 displays a frame of program information in the specified display area in step 607 and moves the preset readiness pattern 501 through 504 to the new display area to form a new readiness map as shown in FIG. 16 in step 608. In FIG. 16, the display area is set for the channels 7 through 14 and for hours from 12/17 19:00 to 12/18 7:59. Then, the controller 225 makes a test to see if the user has issued a termination command in step 609. If so, the controller 225 ends the operation. If the test result is NO in step 606 or 609, the controller 225 returns to step 603.

The readiness pattern may be in any form and have more readiness values.

Modifications

In the above-described embodiment, the time to change 328, the create/change time and date 327 and the priority 329 have been set to each program or program guide record. However, the time to change 328, the create/change time and date 327 and the priority 329 may be set to each table type in a manner shown in FIG. 13.

If each of the transport streams carries program information for channels of the other transport streams as well as own channels, the user can get newest program information even during viewing any channel.

Many widely different embodiments of the present invention may be constructed without departing from the spirit and scope of the present invention. It should be understood that the present invention is not limited to the specific embodiments described in the specification, except as defined in the appended claims.

What is claimed is:

1. A digital television transmission system ensuring reception of program information by receivers served by the system, the system including:

means for transmitting a transport stream (hereinafter referred to as "TS") comprising content data for a plurality of channels to receivers;

means for periodically including, in said TS, program information on programs scheduled for broadcasting; and means for including in said program information an expected time of program alteration, identifying a time when any alterations to said program information are going to be transmitted.

2. A digital television receiver for receiving a program contained in a transport stream (hereinafter referred to as "TS"), the receiver comprising:

means for supplying first, second and third electric powers, said means for supplying providing said first electric power constantly and providing said second and said third electric powers in accordance with independent control settings therefor;

a first portion which, when supplied with said first electric power, operates for controlling the digital television receiver and for controlling said second and third electric powers;

a second portion which, when supplied with said second electric power, is enabled to collect program information and an expected time of program alteration included in said TS, said expected time of program alteration identifying a time when any alterations to said program information are going to be transmitted; and a third portion which, when supplied with said third electric power, is enabled to display said program, said first portion comprising:

means for causing said second portion to be supplied with said second power at said expected time previously collected;

means for storing said program information and said expected time; and means, responsive to a request for a display of said program information or said program from a user, for causing said third portion to be supplied with said third power.

3. A digital television receiver as defined in claim 2, wherein said means for causing said second portion to be supplied includes means, responsive to a determination that there are a plurality of said expected times within a predetermined period, for causing said second portion to be supplied with said second power only at a latest one of said expected times.

4. A digital television transmission system as defined in claim 1, further comprising means, responsive to a determination that there are a plurality of said expected times, for adjusting said expected times so as to ensure at least a predetermined interval between any adjacent expected times.

5. A digital television transmission system as defined in claim 1, further comprising means for including in said program information a code and a time indicating that a special broadcast is going to be delivered at said time.

6. A digital television receiver as defined in claim 2, wherein said first portion further comprises:

means, responsive to a detection of a code and a time indicating that a special broadcast is going to be delivered at said time, for storing at least said detected time; and means for causing said second portion and said third portion to be supplied with said second and third powers, respectively, at said detected time.

7. A digital television transmission system as defined in claim 1, further comprising means for including in said program information a code indicating that a special broadcast is being delivered.

8. A digital television receiver as defined in claim 2, wherein said first portion further comprises:
   means, responsive to a detection of a code indicating that a special broadcast is being delivered, for causing said second portion and said third portion to be immediately supplied with said second and third powers, respectively.

9. A digital television transmission system as defined in claim 5, further comprising means responsive to a detection of said code, for transmitting an alert signal via a transmission medium different from a transmission medium used for transmitting said TS.

10. A digital television receiver as defined in claim 6, wherein said first portion further comprises means, responsive to a reception of an alert signal via a transmission medium different from a transmission medium used for transmitting said TS, for causing said second portion to be supplied with said second power for a reception of said code and said time.

11. A digital television transmission system as defined in claim 5, further comprising: means responsive to a detection of said code for transmitting an alert signal at said time via transmission media different from said TS.

12. A digital television receiver as defined in claim 6, wherein said first portion further comprises means, responsive to a reception of an alert signal via a transmission medium different from a medium used for transmitting said TS, for causing said second portion and said third portion to be immediately supplied with said second and third powers, respectively.

13. A digital television transmission system as defined in claim 7, further comprising means responsive to a detection of said code for transmitting an alert signal via transmission media different from said TS.

14. A digital television transmission system as defined in claim 1, further comprising means for including in said program information a time and date of program alteration.

15. A digital television receiver as defined in claim 2, wherein said first portion further comprises:
   means for making a test to see if received program information has already been stored in said means for storing said program information; and
   means, response to an affirmative decision by said means for making a test, for updating already stored program information with said received program information only if times and dates of said already stored program information and said received program information are different from each other.

16. A digital television transmission system as defined in claim 1, further comprising means for including a priority in said program information.

17. A digital television receiver as defined in claim 2, wherein said program information comprises program records associated with respective programs and wherein said first portion further comprises:
   means for making a test to see if received program information has already been stored in said means for storing said program information; and
   means, response to a negative decision by said means for making a test, for making another test to see if there is any program record having a priority field whose value is lower in priority than that of a received program record; and
   means, responsive to an affirmative decision by said means for making another test, for discarding said found program record having said lower priority value and storing said received program record.

18. A digital television receiver as defined in claim 17, wherein a reception interval for each program record is used as said priority assuming that the longer the reception interval, the higher the priority.

19. A digital television receiver as defined in claim 18, wherein said first portion further comprises means for calculating said reception interval for each program.

20. A digital television transmission system as defined in claim 1, further comprising means for including in said program information a transmission interval for said program information.

21. A digital television receiver as defined in claim 18, wherein said first portion further comprises:
   means for displaying a frame of program information;
   means for applying a preset index pattern to a matrix comprising cells defined by channel columns and time rows to yield an index map, said preset index pattern being arranged such that a larger index is assigned to cells having higher possibility of access; and
   means for collecting program information according to said index map.

22. A digital television receiver as defined in claim 21, wherein means for collecting program information comprises means for collecting detailed information for programs with largest index.

* * * * *